(No Model.)  2 Sheets—Sheet 1.
F. G. BECKER.
HARVESTER REEL.
No. 338,020. Patented Mar. 16, 1886.
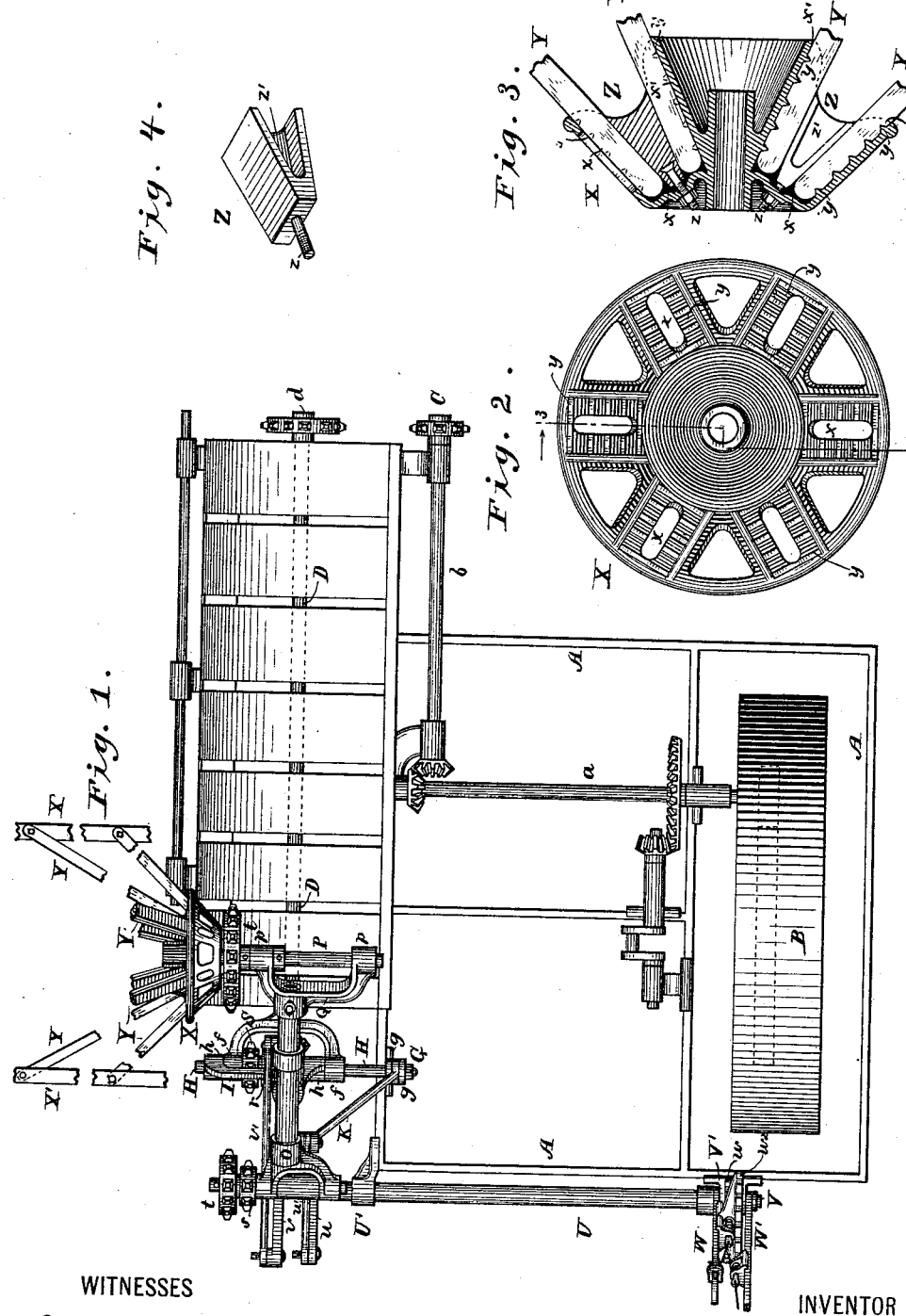
WITNESSES
Ed. A. Newman,
Cel. C. Newman,
INVENTOR
Frederick G. Becker,
By his Attorneys (No Model.)
F. G. BECKER.
HARVESTER REEL.
No. 338,020.
2 Sheets—Sheet 2.
Patented Mar. 16, 1886.
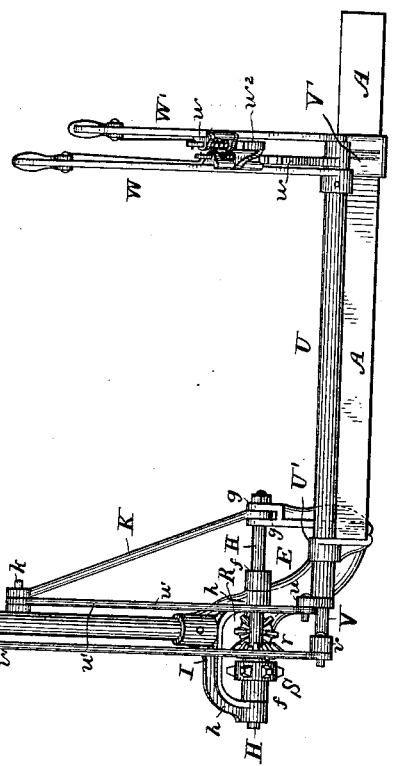
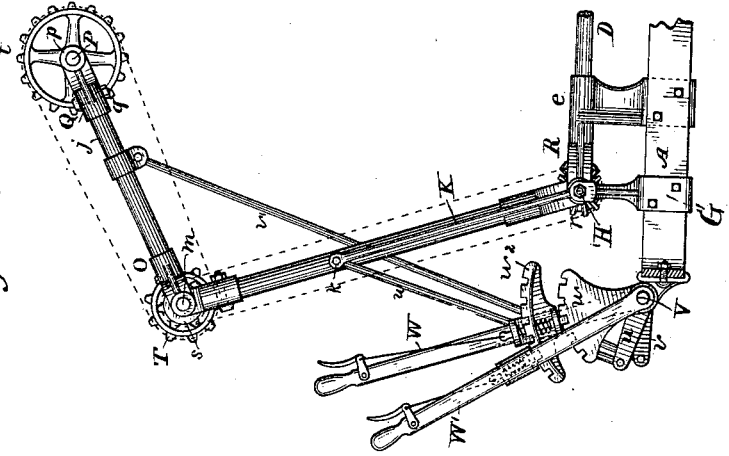
WITNESSES
Ed. A. Newman
Cel. C. Newman
INVENTOR
Frederick G. Becker,
By his Attorneys
Baldwin, Hopkins & Peyton

UNITED STATES PATENT OFFICE.

FREDERICK G. BECKER, OF BROCKPORT, NEW YORK, ASSIGNOR TO DAYTON S. MORGAN & CO., OF SAME PLACE.

HARVESTER-REEL.

SPECIFICATION forming part of Letters Patent No. 338,020, dated March 16, 1886.

Application filed March 19, 1885. Serial No. 159,447. (No model.)

*To all whom it may concern:*

Be it known that I, FREDERICK G. BECKER, of Brockport, in the county of Monroe and State of New York, have invented certain new and useful Improvements in Harvester-Reels, of which the following is a specification.

My invention relates to improvements in reels applicable to harvesters of the one-wheel class, particularly grain-binding harvesters; and my invention consists in certain novel features of construction and combinations of parts involving improvements in the manner of securing the reel-arms to their head or carrier, in the manner of supporting the reel, in means for vertically and horizontally adjusting it, and in the manner of driving it.

In the accompanying drawings, which show my improvements as applied to a grain-binding harvester of well-known type, those features of the machine illustration of which is thought to be needed to convey a full understanding of my invention are shown.

Omitted parts may be of any suitable and well-known construction, and my improvements, in whole or in part, may be applied to machines differing more or less from that in this instance in part shown.

Figure 1 is a plan or top view with parts broken away, portions of two only of the series of reel bats or beaters being shown. Fig. 2 is a face elevation of the reel head or carrier. Fig. 3 is a vertical section, on the line 3 3 of Fig. 2, of the reel-head, showing portions of two pairs of reel-arms and the manner of securing them in place in their head. Fig. 4 is a view in perspective of one of the wedge-blocks by which the reel-arms are secured in pairs in the sockets in the reel-head. Fig. 5 is a view in elevation, as seen from the outer or stubble side of the machine, showing the manner of supporting the reel and the mechanism for adjusting it, a portion only of the frame being represented. Fig. 6 is a front elevation of the parts shown in Fig. 5.

As in this instance organized, but not in detail represented, the main frame A and the driving-wheel B, with the axle (not shown) of which the frame is designed to have vertically-adjustable connection, are the same as shown and described in my Patent No. 317,964, dated May 19, 1885, for improvements in harvesters, and also as shown in the application of said patent a finger-beam and a grain-platform, both having rigid connection with the main frame, are to be provided. None of these features, alone or in combination with each other, are herein claimed.

A counter-shaft, $a$, mounted in suitable bearings in the main frame and actuated by gearing-connection with the driving-wheel, in usual and well-known way, is geared with a suitably-mounted secondary shaft, $b$, provided with a sprocket-pulley, C, for driving, by means of a chain and a sprocket-wheel, $d$, the ordinarily-employed rotating packer-shaft D of well-known grain-binding mechanism, detailed description of which is not here needed. At its forward end the packer-shaft D is supported in the bearing-sleeve $e$ of a bifurcated bearing-bracket, E, of the main frame. This bearing-bracket is strongly secured at its base to the main frame by means of flanges and bolts and nuts, and projects upwardly and inwardly from its base to its sleeved portion $e$, and thence forwardly, terminating in the two bearing-arms or perforated branches $f\,f$. An upright bearing-bracket, G, secured at its base to the main frame and slotted or doubly lugged at top, is perforated through the lugs $g\,g$, to form a bearing in line with the bearings formed in the ends of the arms $f\,f$ of the bifurcated bearing-bracket. A pivot-rod, H, passes through the bearing-lugs $g\,g$, and through the bearings in the arms $f\,f$, and is detachably secured against endwise movement in suitable way. A vertically-rocking bracket, I, is formed of yoke shape and mounted by its perforated arms $h\,h$ upon the pivot-rod H. This bracket supports a vertically and horizontally adjustable reel-post. The reel-post is made in two parts or sections—a lower or main section, J, and an upper section, $j$, jointed thereto, as further on to be described. The main section of the reel-post is suitably secured to the rocking bracket I, as by means of a cross-pin, firmly holding the lower end of the post in a socket, $i$, of the bracket, so that the post may be vibrated or rocked about the pivot-rod H with the bracket. An inclined brace-rod, K, is suitably connected at its upper end—as by the bolt or pin $k$—with the main section of the reel-post about midway its length, and at its lower end this brace-rod is jointed to the pivot-rod H between the bearing-lugs $g\ g$.

A socketed coupling-sleeve, L, and a bifurcated coupling-bracket, N, serve to make suitable jointed connection between the two sections of the reel-post in the following way: The socket $l$ of the coupling-sleeve fits upon the upper end of the main section of the post, and is adjustably secured thereto by means of a headed bolt passing through the post and through elongated slots in the socket and held by a clamp-nut, as will readily be understood. The sleeve or bearing portion M of this coupling-sleeve receives a detachable pivot-pin, $m$, endwise movement of which is prevented in suitable well-known way. The perforated ends of the arms or branches $n\ n$ of the coupling-bracket N are fitted to the pivot-pin $m$ so as to rock about it, and the inner or lower end of the upper section, $j$, of the reel-post is fastened in the socket O of this bracket in obvious way. A rotating reel-shaft, P, is mounted in a supporting-bracket, Q, secured to the outer end of the upper section of the reel-post. This supporting-bracket for the reel-shaft is adjustably and detachably secured to the reel-post section $j$ by means of the slotted socket $q$ and a headed bolt passing through the post-section and through the slots of the socket and clamped in place by a nut. The reel-shaft rotates in bearings formed in the ends of the forks $p\ p$ of its supporting-bracket, endwise movement of the shaft being prevented by collars or in other well-known way.

Motion is imparted, as next to be described, from the packer-shaft D to the reel-shaft, and by it to a suitable reel secured to a reel head or carrier fast on the shaft. A bevel-pinion, R, fast to the front end of the packer-shaft, engages a similar pinion, $r$, formed with or rigidly attached to a sprocket-pulley, S, with which it is loosely mounted on the pivot-rod H, so as to rotate freely. A driving-chain (shown by dotted lines, Fig. 5) passes from the pulley S about a similar pulley, $s$, formed with or rigidly attached to a larger sprocket-pulley, T, with which it is loosely mounted on the pivot-rod $m$ of the joint connecting the two sections of the reel-post. A driving-chain (shown by dotted lines, Fig. 5) passes from the pulley T about a comparatively large sprocket-pulley, $t$, fast on the reel-shaft P.

The reel-post is actuated to raise or lower the reel-shaft and to move it backward or forward by adjusting mechanism, as follows: A cranked tubular rock-shaft, U, and a cranked rock-shaft, V, passing through it, are mounted to oscillate in bearing-brackets U' V' of the main frame. The tubular rock-shaft passes through the bracket U', so that the inner rock-shaft, V, is supported by way of its enveloping-shaft at one end in said bracket, while at the opposite end the inner shaft extends beyond the tubular shaft through the bracket V' and supports the adjacent end of the tubular shaft in this bracket. The two rock-shafts have jointed connection by way of their end cranks, $u$ and $v$, with the reel-post sections J and $j$, respectively. A connecting-rod, $u'$, is pivoted at its lower end to the crank $u$ of the rock-shaft U, and unites at its opposite end with the lower section of the reel-post by way of the pin $k$. A connecting-rod, $v'$, is pivoted at its lower end to the crank $v$ of the rock-shaft V, and at its opposite end is joined to the upper section of the reel-post toward its outer end. Actuating-levers and detent devices therefor are attached to the ends of the rock-shafts opposite those provided with the cranks and connecting-rods. The lever W is fastened to the tubular rock-shaft and provided with an ordinary spring-actuated endwise-moving detent bolt or tooth for engagement with a fixed toothed segment or detent-rack, $w$, formed with the bearing-bracket V'. The lever W', provided with a detent-bolt, $w'$, similar to that of the lever W, is fastened to the rock-shaft V. A toothed segment or detent-rack, $w^2$, for engagement with the detent-bolt of the lever W', is fixed to the lever W of the tubular rock-shaft, so that both rock-shafts may be actuated simply by manipulating this lever W.

From the above description it will be seen that when it is desired to raise or lower the reel the lever W' is manipulated, a backward movement of this lever raising the reel by reason of the upward movement imparted to the outer end of the upper section of the reel-post, and a forward movement of the lever lowering the reel by the reverse movement of the upper section of the post about its jointed connection with the main section thereof. The movements thus imparted to the upper section of the reel-post do not adjust the reel horizontally or backward or forward to any material extent. To horizontally adjust the reel, the main section of the reel-post is vibrated by manipulating the lever W to operate the tubular rock-shaft in obvious way. By mounting the detent-rack for the lever W' upon the lever W the rock-shaft for adjusting the upper section of the reel-post independently of the lower section is operated by the actuation of the lever W, and in this way the upper section of the reel-post is allowed to partake of the movements of the lower section (it must necessarily do this) without requiring that the two levers be independently operated at the same time, to do which would require the use of both hands of the operator. A reel head or carrier, X, secured by its hub to the reel-shaft, so as to rotate therewith, is provided with flaring sockets $x$, corresponding in number with the number of reel bats or beaters X' employed. In this instance there are six sockets. In cross-section (see Fig. 3) the sockets are approximately V-shaped. The inclined opposite walls, $x'\ x'$, of each socket are provided with pointed teeth or doubly-inclined ribs $y\ y$. Two reel-arms, Y Y, secured in a single socket are employed for each reel-beater, and the arms of each pair diverge from their socket to their attached beater. The reel-arms are secured in the sockets of the reel-head by wedge-blocks Z and the teeth $y$ of the inclined walls of the sockets. Each wedge-block is provided with a threaded shank, $z$, at its inner or narrowed end. In the construction shown the shank is secured to the wedge-block in the process of casting the block, a headed screw-bolt being placed in the mold for the block, so that the metal forming the inner end and longitudinal central web, $z'$, of the block will envelop the head of the bolt, as will readily be understood.

From the above description it will be seen that the inner ends of a pair of reel-arms are firmly secured at the proper inclination to each other in their socket in the reel-head simply by forcing a wedge-block between them until the socket-teeth are suitably embedded in the arms, and that the nuts on the ends of the shanks $z$ secure the wedge-blocks in place. To remove the blocks for detaching the reel-arms, these nuts are unscrewed and the wedge-blocks loosened by striking the shanks, after which the parts may readily be separated.

I claim as of my own invention—

1. The combination of the main frame, the rotating packer-shaft, the bifurcated bearing-bracket of the main frame supporting the packer-shaft at front, the upright bearing-bracket of the main frame, the pivot-rod supported by said brackets, and the rocking bracket mounted on the pivot-rod for supporting the reel-post, substantially as and for the purpose hereinbefore set forth.

2. The combination of the main frame, the bifurcated bearing-bracket thereof, the upright bearing-bracket, the pivot-rod supported by said brackets, the vertically-rocking bracket supported on the pivot-rod, the reel-post secured to said rocking bracket, and the inclined brace-rod connected with the reel-post and pivot-rod, substantially as and for the purpose hereinbefore set forth.

3. The combination of the upper section of the reel-post, the lower section of the reel-post having jointed connection therewith, the main frame with which the main section of the reel-post has pivotal supporting-connection, the cranked tubular rock-shaft, the cranked rock-shaft passing therethrough, the rods connecting the cranks of the rock-shafts with the lower section and the upper section, respectively, of the reel-post, the actuating-levers of the rock-shafts, and their detent devices, substantially as and for the purpose hereinbefore set forth.

4. The combination of the reel-head having flaring sockets provided with the pointed teeth, the diverging reel-arms, and the wedge-blocks secured between the reel-arms, substantially as and for the purpose hereinbefore set forth.

In testimony whereof I have hereunto subscribed my name.

FRED. G. BECKER.

Witnesses:
WM. P. MORGAN,
H. C. HAMMOND.